United States Patent [19]
Bahn

[11] Patent Number: 5,289,099
[45] Date of Patent: Feb. 22, 1994

[54] DIRECT CURRENT MOTOR

[75] Inventor: Itsuki Bahn, Tokyo, Japan

[73] Assignee: Kabushikigaisha Sekogiken, Tokyo, Japan

[21] Appl. No.: 877,176

[22] PCT Filed: Nov. 5, 1991

[86] PCT No.: PCT/JP91/01516

§ 371 Date: Jul. 2, 1992

§ 102(e) Date: Jul. 2, 1992

[87] PCT Pub. No.: WO92/09138

PCT Pub. Date: May 29, 1992

[30] Foreign Application Priority Data

Nov. 7, 1990 [JP] Japan .................. 2-299858

[51] Int. Cl.⁵ ................................ H02P 1/40
[52] U.S. Cl. ........................ 318/739; 318/812; 318/439
[58] Field of Search ........ 318/798, 784, 771, 739-740, 318/747-749, 254, 138, 439

[56] References Cited

U.S. PATENT DOCUMENTS

| | | | |
|---|---|---|---|
| Re. 30,761 | 10/1981 | Ban et al. | 318/439 |
| 4,295,083 | 10/1981 | Leenhouts | 318/254 X |
| 4,392,098 | 7/1983 | Min | 318/758 |
| 4,558,264 | 12/1985 | Weischedel | 318/254 |
| 4,672,290 | 6/1987 | Ghosh et al. | 318/817 |
| 4,719,399 | 1/1988 | Wrege | 318/817 X |
| 4,959,573 | 7/1990 | Roberts | 318/817 X |
| 5,075,610 | 12/1991 | Harris | 318/254 X |
| 5,138,244 | 8/1992 | Bahn | 318/701 |

Primary Examiner—William M. Shoop, Jr.
Assistant Examiner—David Martin
Attorney, Agent, or Firm—Staas & Halsey

[57] ABSTRACT

A three-phase Y-connection direct current motor, which is not only capable of operating at a high efficiency and at high speeds but also small-sized and inexpensive. A position detection device includes three Hall elements for detecting the rotational position of a rotor of the motor, and supplies first-, second- and third-phase position detection signals each having a width equivalent to an electrical angle of 120 degrees and position detection signals having a phase difference of 60 degrees with respect to the corresponding ones of the first-, second- and third-phase position detection signals to an energization control circuit The energization control circuit successively energizes transistors (10a–10d, 11a–11h) of transistor bridge circuits associated with respective phases of armature coils (4a–4c) to supply a current to the armature coils in forward and reverse directions. When the energization of an armature coil is interrupted, capacitor (16a–16c) connected to a reverse current-preventing diode (17a–17c) is electrified by magnetic energy stored in the armature coil to rapidly reduce the magnetic energy, and when the energization of an armature coil is started, the armature current is rapidly raised by the voltage charged in the capacitor.

9 Claims, 6 Drawing Sheets

DIRECT CURRENT MOTOR

DESCRIPTION

1. Technical Field

This invention relates to a direct current motor used as a drive source or the like for a constant-speed drive, constant-torque drive, or servo control in various industrial machines, more particularly to a high-speed three-phase d.c. motor.

2. Background Art

Conventionally, as the high-speed motors, for example, the semiconductor motors including the coreless motor having a small inductance (brushless motors) are used. Usually, the motors of this type include the direct-current power supply for rectifying the output of an alternating-current power supply, and thus have disadvantages such as being large-sized and expensive. Particularly, in the case wherein an inverter is used, this drawback will become conspicuous. Further, the above conventional motors have a maximum speed of 3000 to 6000 revolutions per minute, and a reduction of the maximum speed is unavoidable when a higher output is required.

If however, the voltage applied to the motor is increased to increase the rotational speed, the efficiency of the motor falls and the practicality of the motor will be lost.

Furthermore, there has not yet been developed any electric circuit for a constant-torque drive, constant-speed drive or servo control which is capable of guaranteeing stable operation, especially efficient operation, during the high-speed operation of the motor.

SUMMARY OF THE INVENTION

An object of the present invention is to provide a small-size and inexpensive direct current motor capable of operating at high-speeds and a high speed and a high-efficiency.

To achieve the above object, this invention provides a direct current motor comprising: a position detection device for successively delivering a first position detection signal group and a second position detection signal group in accordance with a rotational position of a rotor of the direct current motor, the first position detection signal group including a plurality of position detection signals equal in number to phases of the direct current motor and to each of such phases, the second position detection signal group including a plurality of position detection signals having a predetermined phase difference with respect to corresponding ones of the first position detection signal group; an energization control circuit connected to a direct current power supply for successively energizing armature coils of the individual phases in a forward direction in accordance with the first position detection signal group, and successively energizing the armature coils of the individual phases in a reverse direction in accordance with the second position detection signal group; a group of diodes for preventing a reverse current, provided between the direct current power supply and the armature coils of the respective phases; capacitors connected to the diodes respectively; and circuit means for charging magnetic energy, which is stored in the armature coil of each phase when an energization thereof is interrupted, in the capacitor connected to the diode associated with the armature coil, thereby rapidly reducing the stored magnetic energy, and for rapidly raising an armature current passing through the armature coil of each phase in the reverse direction, by a voltage charged in the capacitor when an energization of the armature coil in the reverse direction is started.

Preferably, the direct current motor further comprises a chopper circuit for interrupting the energization of the armature coil of each phase when the armature current flowing therethrough becomes greater than an upper limit, as well as for restarting the energization when the armature current becomes smaller than a lower limit.

As described above, according to this invention, the capacitor is charged with the magnetic energy stored in the armature coil, of which the energization is interrupted, not only for quickly reducing the stored magnetic energy but also for causing the inverse armature current to rise rapidly by the voltage of the capacitor when the inverse energization of the armature coil of each phase is started. Thus, the reaction torque caused by the stored magnetic energy, and the reduction of torque resulting from the delayed rise of the armature current can be prevented, whereby not only the rotational speed of the motor can be increased but also its operating efficiency can be improved.

Therefore, the motor of this invention is suitable for the drive source of a drilling machine, polishing machine, electric car and the like. In case of using a power supply unit capable of rectifying the alternating current to obtain the direct current, a capacitor with a small capacitance can be used as the smoothing capacitor forming the part of the power supply, so that the power supply, and thus the motor can be made smaller and less costly. Preferably, the chopper circuit is used to control the armature current, i.e., the motor output torque, within a predetermined range, so that the motor output torque can be controlled variably or to a constant torque. Further, the output torque control permits the constant-speed operation of the motor.

DESCRIPTION OF THE PREFERRED EMBODIMENTS

Referring to FIGS. 1 through 5, a three-phase Y-connection semiconductor motor according to the first embodiment of this invention will be described. In the following, degrees represent electrical angles.

Figure 1:
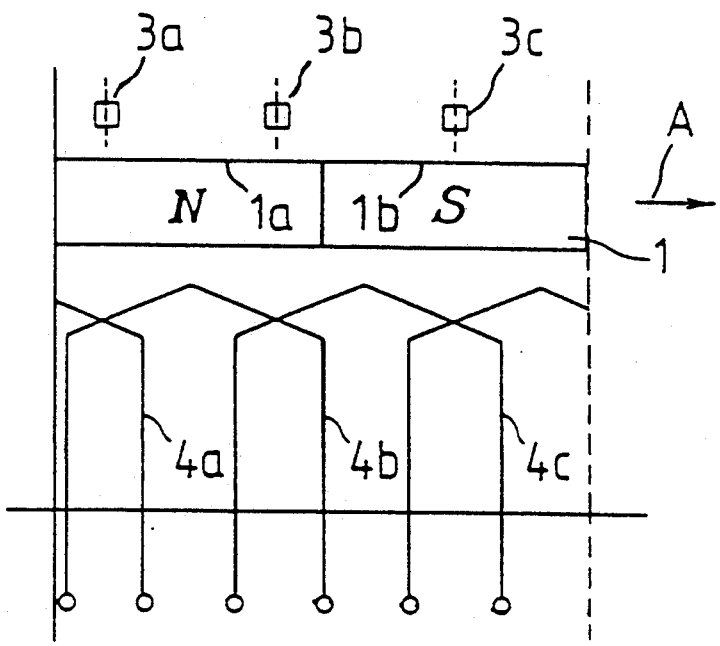
FIG. 1 is a development showing a magnet rotor and armature coils of a direct current motor according to a first embodiment of this invention.
Figure 2:
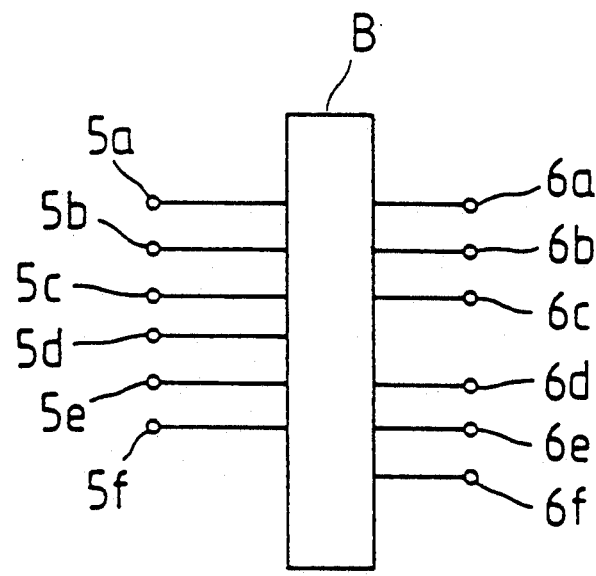
FIG. 2 is a block circuit diagram showing a logic circuit constituting a position detection device in cooperation with position detecting elements shown in FIG. 1.

The semiconductor motor comprises a body having a magnet rotor 1 and first- to third-phase armature coils 4a to 4c, as shown in the development of FIG. 1, and a position detection device for detecting the rotational position of the rotor 1. The position detection device includes Hall elements 3a through 3c shown in FIG. 1, and a logic circuit B shown in FIG. 2. In FIG. 1, symbol A represents the direction of rotation of the motor.

The Hall elements 3a through 3c are spaced from each other by 120 degrees and are fixed to the armature side of the motor body, opposite magnetic poles 1a and 1b of the rotor 1. The logic circuit B generates six series of position detection signals for driving the motor in accordance with electrical signals outputted from the Hall elements 3a to 3c, and has a construction known in the art. More specifically, electrical signals 25, 27 and 29 (FIG. 5), supplied from the Hall elements 3a to 3c, and electrical signals 26, 28 and 30 (FIG. 5), obtained by inverting the electrical signals, are supplied to input terminals 5a to 5f of the logic circuit B respectively through an amplifying means (not shown), and the logic circuit B outputs position detection signals 31 to 36 (FIG. 5), which are obtained in accordance with the input electrical signals, through output terminals 6a to 6f thereof. The Hall elements 3a to 3c are positioned in such a manner that they can generate position detection signals, which enables an electric current to the armature coils 4a to 4c of the respective phases during the period in which a maximum torque of the motor is available.

Figure 3:
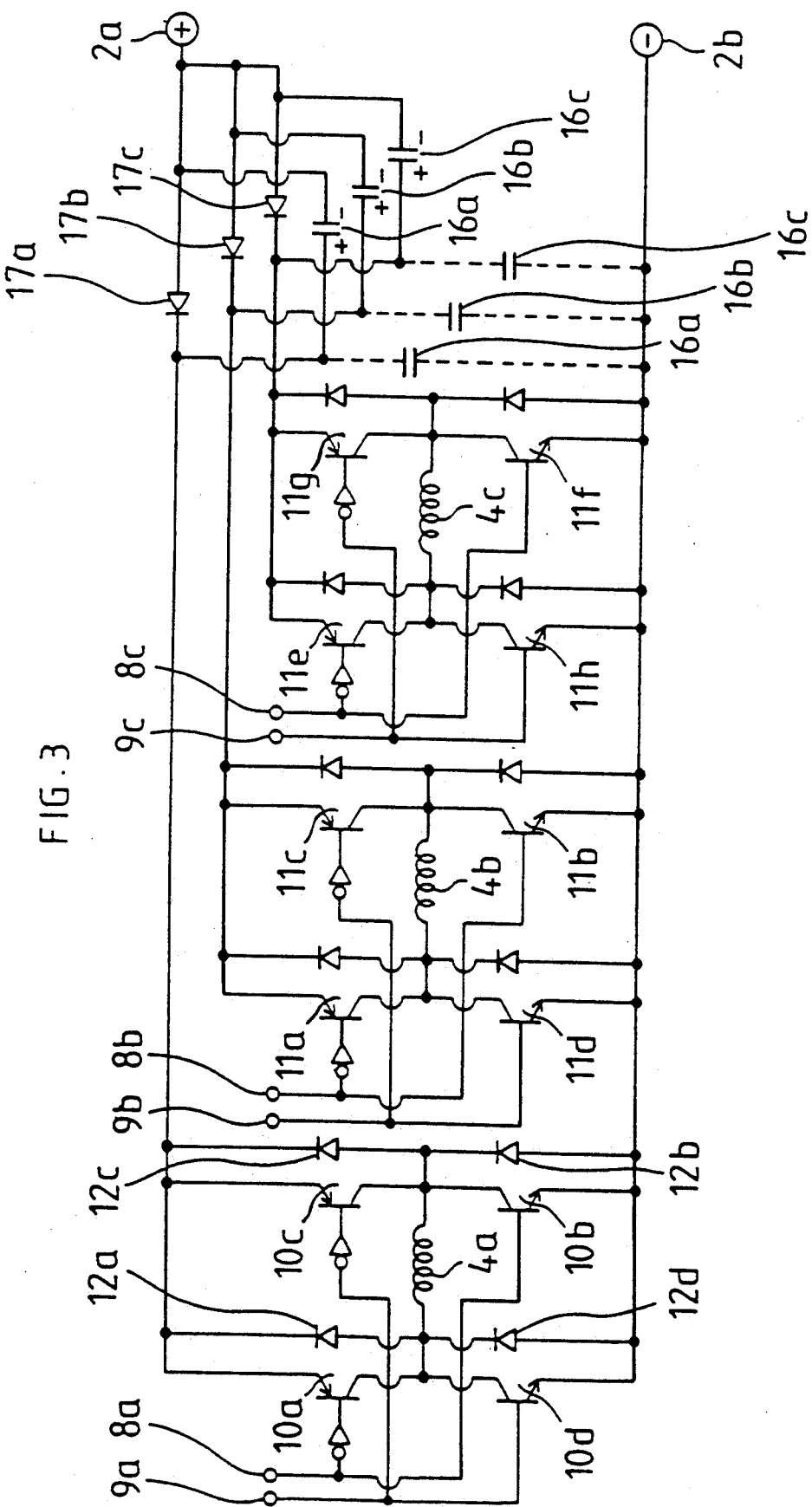
FIG. 3 is a circuit diagram showing an energization control circuit associated with the position detection device shown in FIGS. 1 and 2.

The d.c. motor further comprises an energization control circuit, shown in FIG. 3, which controls the current supply to the first- to third-phase armature coils 4a to 4c, and a direct-current power supply for supplying electric power to this circuit. The energization control circuit has input terminals 8a to 8c and 9a to 9c connected respectively to the output terminals 6a to 6f of the logic circuit B.

The circuit arrangement of the energization control circuit relating to the first-phase armature coil 4a will be described.

The armature coil 4a is connected at its one end to the collector of a transistor 10a; the emitter of the transistor is connected to a positive terminal 2a of the d.c. power supply through a diode 17a; and a base of the transistor is connected to the input terminal 8a of the energization control circuit through an inverter. The input terminal 8a is connected to the base of a transistor 10b, and the emitter of which is connected to a negative terminal 2b of the d.c. power supply and also to the emitter of another transistor 10d. The collector and base of the transistor 10d are connected to the junction between the armature coil 4a and the transistor 10a and the input terminal 9a of the energization control circuit respectively. The collector of the transistor 10b is connected to a junction between the armature coil 4a and the collector of a transistor 10c; the emitter of transistor 106 is connected to the positive terminal 2a of the d.c. power supply; and the base of transistor 106 is connected to the input terminal 9a of the energization control circuit through an inverter. The anode of a diode 12a and the cathode of a diode 12d are connected to the junction between the armature coil 4a and the transistors 10a and 10d respectively. The cathode of the diode 12a is connected to the junction between the transistor 10c and the diode 17a, and the anode of the diode 12d is connected to the negative terminal 2b of the d.c. power supply. A diode 12b with its anode connected to the negative terminal 2b of the d.c. power supply has a cathode connected to the junction at which a diode 12c, the armature coil 4a and transistors 10b and 10c are connected. The cathode of the diode 12c is connected to the junction between the transistor 10a and the diode 17a. The armature coil 4a and the transistors 10a through 10d constitute a first bridge circuit, and a capacitor 16a is connected in parallel with the diode 17a.

The arrangements of the energization control circuit related to the second- and third-phase armature coils 4b and 4c are identical with the above-described arrangement associated with the armature coil 4a, and thus a detailed description thereof is omitted. In FIG. 3, transistors 11a to 11d, a capacitor 16b and a diode 17b, which are associated with the coil 4b, and transistors 11e to 11h, a capacitor 16c and a diode 17c, which are associated with the coil 4c, correspond respectively to the elements 10a to 10d, 16a and 17a, which are associated with the coil 4a. The armature coil 4b and the transistors 11a to 11d constitute a second bridge circuit, and the armature coil 4c and the transistors 11e to 11h constitute a third bridge circuit.

Figure 6:
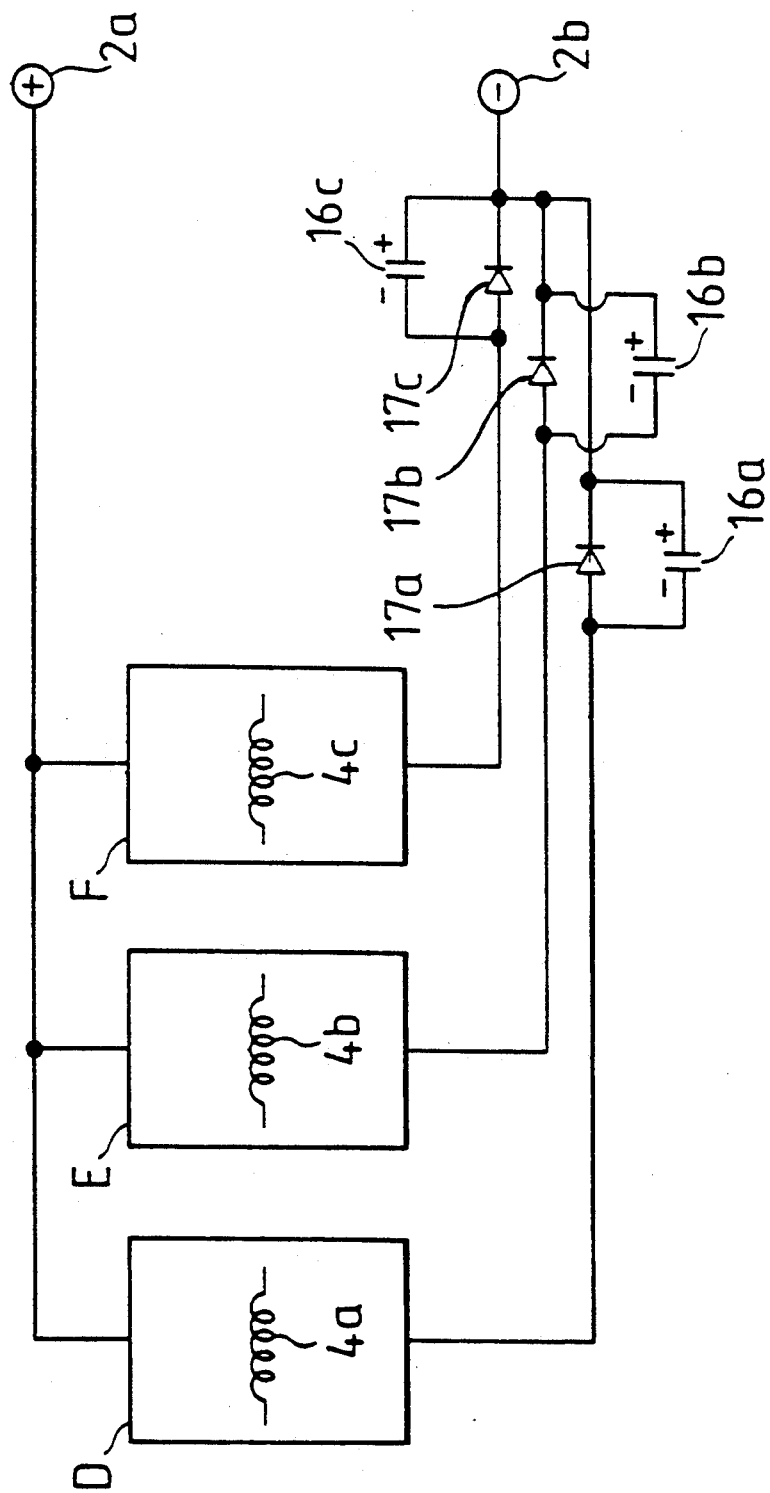
FIG. 6 is a block circuit diagram showing a modification of the energization control circuit in FIG. 3.

The transistors 10a through 11h may be formed by other semiconductor switching elements. For a high-output motor, a switching element called IGBT, which is a combination of a field-effect transistor and a transistor, is preferably used. Further, the capacitors 16a, 16b and 16c may be connected in the manner indicated by dashed lines in FIG. 3. Furthermore, as shown in FIG. 6, the diodes 17a, 17b and 17c and the capacitors 16a, 16b and 16c may be arranged on the side of the negative terminal 2b of the d.c. power supply. In FIG. 6, symbols D, E and F denote the first to third transistor bridge circuits including the armature coils 4a, 4b and 4c respectively, and the diodes 17a, 17b and 17c are each connected in a forward direction to permit the flow of an armature current.

The operation of the d.c. motor constructed as above will be now described.

When the rotor 1 is rotated, rectangular electrical signals 25, 27 and 29 (FIG. 5) are respectively generated by the Hall elements 3a to 3c, and supplied to the input terminals 5a, 5c and 5e of the logic circuit B respectively. These electrical signals become high-level (indicated at 25a, 25b, 27a, 27b, 29a and 29b in FIG. 5) when the Hall elements 3a to 3c are within the magnetic field of the magnetic pole (S pole) 1b. Electrical signals 26, 28 and 30, which are obtained by inverting the above electrical signals by using an element (not shown), are supplied to the input terminals 5b, 5d and 5f of the logic circuit B respectively. The high-level electrical signals 25a to 30b each have a width of 180 degrees, and adjacent ones thereof (e.g., the signals 25a and 25b) are separated from each other by 180 degrees. The logic circuit B supplies the first to sixth position detection signals 31 to 36, derived from the electrical signals 25 to 30, to the input terminals 8a to 8c and 9a to 9c of the energization control circuit in FIG. 3, from the output terminals 6a to 6f thereof.

When a high-level signal 31a is inputted to the input terminal 8a of the energization control circuit, the transistors 10a and 10b are rendered conductive. As a result, both ends of the armature coil 4a are respectively connected to the positive and negative terminals 2a and 2b of the d.c. power supply, and thus an electric current flows through the armature coil 4a in a forward direction (to the right in FIG. 3). When a high-level signal 34a is inputted to the input terminal 9a, the transistors 10c and 10d are turned on, whereby an electric current flows through the armature coil 4a in a reverse direction (to the left). Similarly, when a high-level signal 32a or 35a is inputted to the terminal 8b or 9b, the armature coil 4b will be energized in the forward or reverse direction. This is the case with the armature coil 4c. As will be understood from above, an electric current is supplied successively to the armature coils 4a to 4c in the forward direction for periods corresponding to the widths of position detection signal curves 31a, 31b, ..., curves 32a, 32b, ..., and curves 33a, 33b, ..., respectively. Further, an electric current is supplied successively to the armature coils 4a to 4c in the reverse direction for periods corresponding to the widths of position detection signal curves 34a, 34b, ..., curves 35a, 35b, ..., and curves 36a, 36b, ..., respectively.

Now referring to FIG. 4, the forward current supply to the armature coil 4a, when the high-level first position detection signal 31a is inputted, will be described.

As mentioned above, when a high-level first position detection signal, indicated by curve 31a, is inputted to the input terminal 8a of the energization control circuit to cause the transistors 10a and 10b to be turned on, the armature coil 4a will be energized in the forward direction. At an initial stage of the energization, the armature current rises due to the inductance of the armature coil 4a as indicated by dashed line 22a in FIG. 4.

When the high-level first position detection signal 31a falls thereafter, the transistors 10a and 10b will be turned off. At this time, an electric current resulting from the magnetic energy stored in the armature coil 4a flows through a closed circuit which is formed of the armature coil 4a, the diode 12c, the capacitor 16a, the positive and negative terminals 2a and 2b of the d.c. power supply, the diode 12d and the armature coil 4a, to electrify the capacitor 16a to the polarity as shown in FIG. 3. Accordingly, the most part of the magnetic energy stored in the armature coil 4a is rapidly converted to electrostatic energy of the capacitor 16a, and the remainder is returned to the d.c. power supply. As a result, the armature current rapidly falls, as indicated by dashed line 22b in FIG. 4.

To describe the energization control of the armature coil 4a in more detail, when the rotor 1 of the d.c. motor is further rotated the position detection signal 34a to be inputted to the input terminal 9a of the energization control circuit, the transistors 10c and 10d are turned on to energize the armature coil 4a in the reverse direction. In this case, the armature coil 4a is supplied with a voltage equal to the sum of the voltage of the d.c. power supply and the voltage charged in the capacitor 16a.

Figure 4:
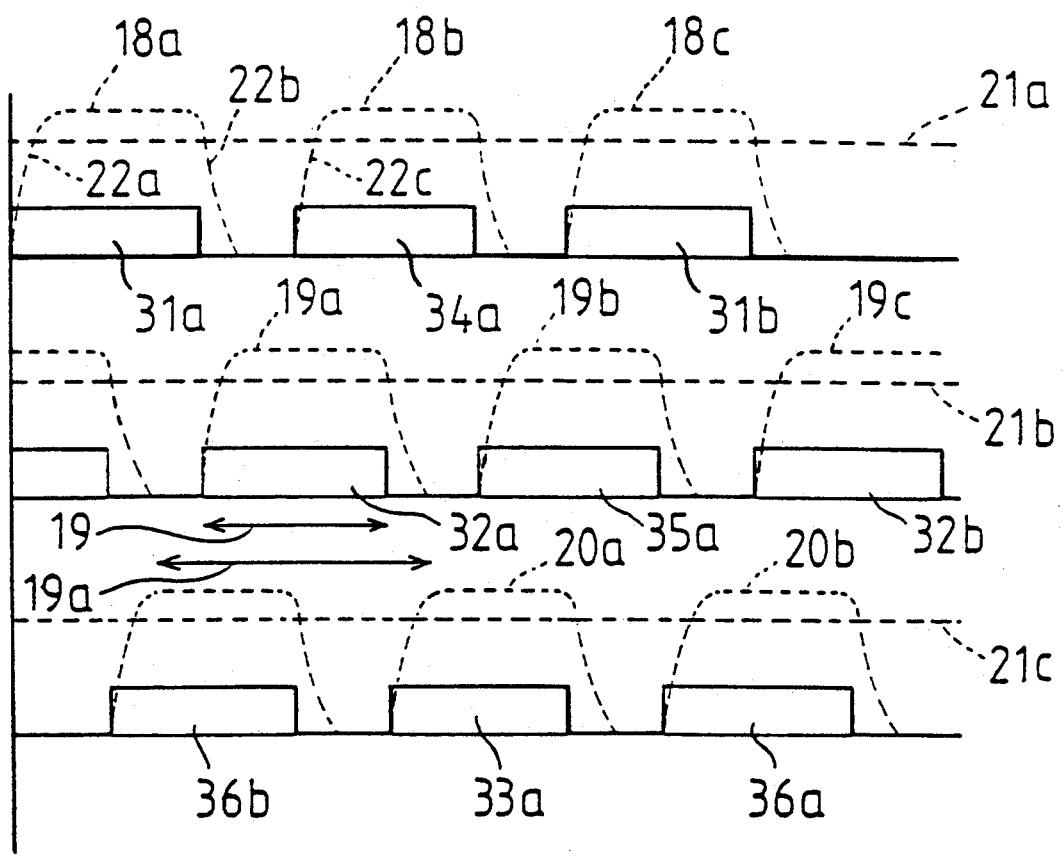
FIG. 4 is a timing chart showing an example of position detection signals outputted from the logic circuit in FIG. 2 together with armature currents.
Figure 5:
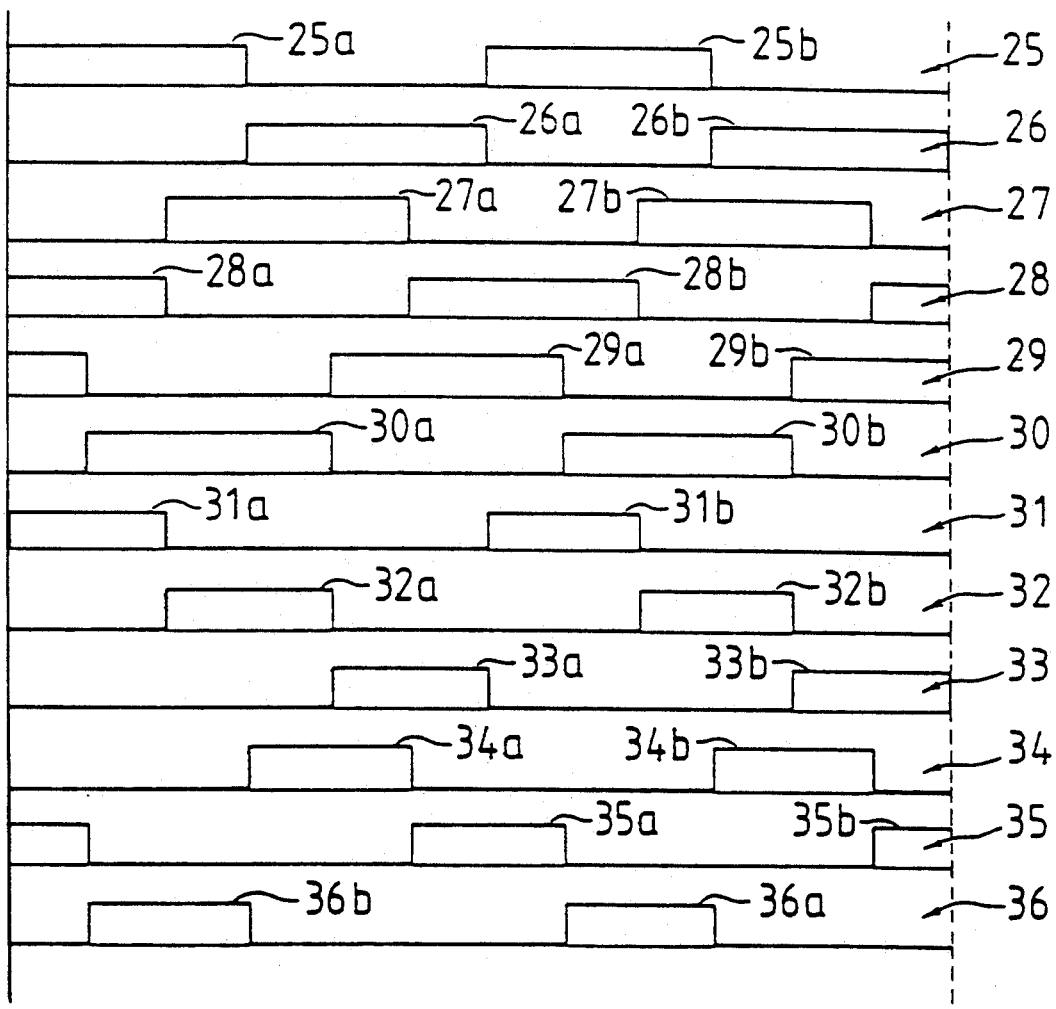
FIG. 5 is a timing chart showing an example of electrical signals supplied from the position detecting elements in FIG. 1 together with the position detection signals.

Accordingly, the armature current 18b rapidly rises, as indicated at 22c in FIG. 4. For the same reason, the rising portion 22a of the armature current 18a will become steep when the position detection signal 31a is supplied. When the signal 34a falls, the capacitor 16a will be charged through the diodes 12a and 12b by the magnetic energy stored in the armature coil 4a, whereby the armature current 18b rapidly falls.

In FIG. 4, symbol 18c represents an electric current to flow through the armature coil 4a when the position detection signal 31b is supplied to the input terminal 8a of the energization control circuit. This armature current also rapidly rises and rapidly falls, due to the same reason as mentioned above.

In a high-speed operation of the d.c. motor, the duration of the position detection signals 31a, 34a and 31b becomes short, whereas the rise time and fall time of the armature current remain unchanged. In conventional motors, when the motor speed exceeds approximately 10,000 revolutions per minute, the widths of the rising and falling portions of the armature current individually become greater than 30 degrees. As a result, the output torque of the motor decreases, whereas reaction torque (reduction of torque) increases, and thus the operating efficiency of the motor falls, thereby making it difficult to increase the rotational speed. By contrast, in the d.c. motor of this invention, the widths of the rising and falling portions of the armature current are reduced by charging and discharging the capacitor 16a, whereby the fall of the motor operating efficiency, which is caused by a torque reduction or an increase in the reaction torque, can be prevented, thereby enabling the high-speed operation. The charge voltage for each of the capacitors 16a, 16b and 16c is set to a value equal to or smaller than the withstand voltage of the transistors 10a to 11h which determines the upper limit of the rotational speed of the motor.

The forward and reverse energization control for the armature coil 4b is carried out in the same manner as that for the armature coil 4a. That is, when the position detection signal 32a or 32b is supplied to the input terminal 8b of the energization control circuit, or when the position detection signal 35a is supplied to the input terminal 9b, the switching of the transistors 11a to 11d is controlled in such a manner that an armature current 19a or 19c flows through the armature coil 4b in the forward direction or that an armature current 19b flows through the armature coil 4b in the reverse direction. In this case, the armature currents 19a, 19b and 19c rapidly rise and rapidly fall, by the actions of the reverse current-preventing diode 17b and the capacitor 16b. In FIG. 4, numeral 19 denotes a 180-degree span in which a forward torque is generated, whereas 19a denotes an energization period having a width of 120 degrees. In general, the positions of the position detecting elements 3a, 3b and 3c shown in FIG. 1 are adjusted so that the energization period 19a is situated in the middle of the forward torque generation period. However, where a high-speed operation of the motor is required, each position detecting element is preferably positioned so that the energization period 19a is advanced toward the beginning of the forward torque generation period (to the left in FIG. 4) to obtain the maximum torque.

The forward and reverse energization control for the armature coil 4c is carried out in the same manner as that for the armature coils 4a and 4b. That is, when the position detection signal 33a is supplied to the input terminal 8c of the energization control circuit, or when the position detection signal 36a or 36b is supplied to the input terminal 9c, the switching of the transistors 11e to 11h is controlled so that the armature current 20a flows through the armature coil 4c in the forward direction or in the reverse direction depending on the direction of the energization. At this time, the armature currents 20a and 20b rapidly rise and rapidly fall, by the actions of the reverse current-preventing diode 17c and the capacitor 16c.

As an electric current is passed through the armature coils 4a, 4b and 4c in the forward and reverse directions, the d.c. motor generates an output torque equal to the sum of torques produced by the armature currents 18a to 18c, 19a to 19c, 20a and 20b. For the reason stated above, the motor is capable of making a high-speed rotation.

A three-phase d.c. motor according to a second embodiment of this invention will be described.

The motor of this embodiment differs from that of the first embodiment in that the energization control circuit includes a chopper circuit for controlling the armature currents and that the capacitors 16a to 16c and diodes 17a to 17c are arranged on the side of the negative terminal 2b of the d.c. power supply, as in the modification shown in FIG. 6. The motor of this embodiment is provided with an energization control circuit shown in FIG. 7.

Figure 7:
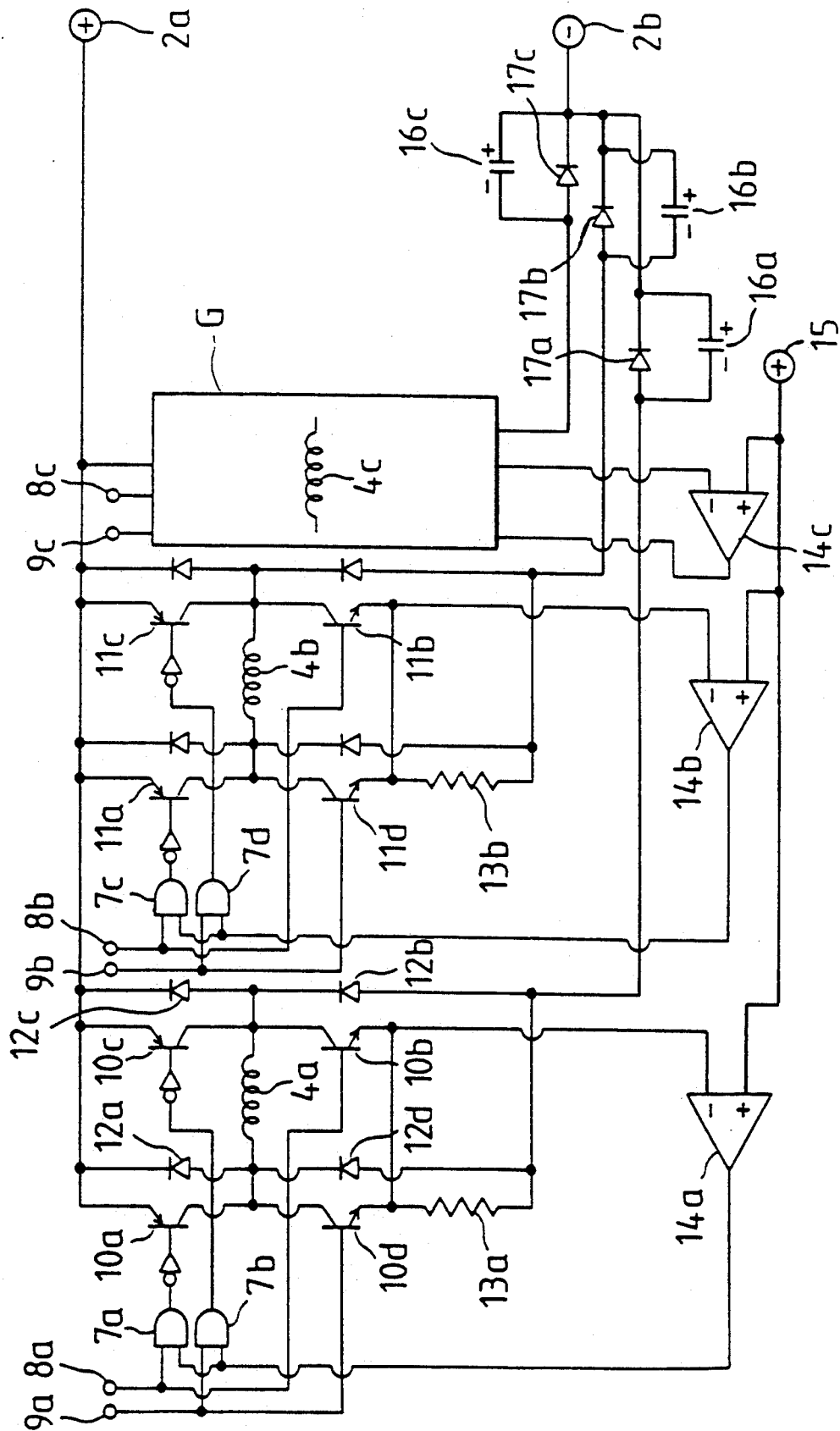
FIG. 7 is a circuit diagram showing an energization control circuit used in a d.c. motor according to the second embodiment of this invention.

As shown in FIG. 7, the energization control circuit includes, in addition to the circuit elements shown in FIG. 3, AND gates 7a and 7b, an operational amplifier 14a and a resistor 13a, which are associated with the armature coil 4a, AND gates 7c and 7d, an operational amplifier 14b and a resistor 13b, which are associated with the armature coil 4b, and AND gates (not shown), an operational amplifier 14c and a resistor (not shown), which are associated with the armature coil 4c. In FIG. 7, block G represents the peripheral circuit elements related to the armature coil 4c.

Those elements which are additionally provided for the armature coil 4a will be described. The AND gate 7a has an input terminal connected to the input terminal 8a of the energization control circuit, another input terminal connected to the output terminal of the operational amplifier 14a, and an output terminal connected to the transistor 10a through an inverter. The AND gate 7b has an input terminal connected to the input terminal 9a of the energization control circuit, another input terminal connected to the output terminal of the operational amplifier 14a, and an output terminal connected to the transistor 10c through an inverter. The operational amplifier 14a has a positive input terminal connected to a reference positive voltage output terminal 15, and a negative input terminal connected to the emitters of the transistors 10b and 10d.

The resistor 13a has one end connected to the emitters of the transistors 10b and 10d and the other end connected to the anode of the diode 12b, and functions as an armature current detecting means.

The elements additionally provided for the armature coils 4b and 4c are connected to the elements in the energization control circuit in the same manner as those added to the armature coil 4a, and thus, the detailed description thereof is omitted here.

The operation of the aforementioned chopper circuit in the energization control circuit of FIG. 7 will be described. The operation of the energization control circuit other than the chopping operation is identical with that described with reference to the first embodiment, and thus the description thereof is omitted.

When the transistors 10a and 10b are rendered conductive due to the supply of the position detection signal 31a to the input terminal 8a of the energization control circuit, and an armature current flows through the armature coil 4a in the forward direction, a voltage drop proportional to the armature current occurs in the resistor 13a. When the voltage drop of the resistor 13a exceeds a reference positive voltage, which is applied to the positive input terminal of the operational amplifier 14a from the reference positive voltage output terminal 15, the output of the operational amplifier 14a becomes low level from a high level, whereby the AND gate 7a is closed, making the transistor 10a unconductive. In this case, the magnetic energy stored in the armature coil 4a is discharged in the form of a current flowing through a closed circuit formed by of the armature coil 4a, the transistor 10b, the resistor 13a, the diode 12d and the armature coil 4a. As a result, the armature current is reduced.

As the armature current decreases, the voltage drop of the resistor 13a, i.e., the voltage applied to the negative terminal of the operational amplifier 14a, is gradually reduced. When the applied voltage is reduced from a set value corresponding to the reference positive voltage to a predetermined value, which is dependent on the hysteresis characteristic of the operational amplifier 14a, the output of the operational amplifier 14a again becomes high level, and the AND gate 7a is opened to cause the transistor 10a to be turned on. As a result, the armature current flowing through the armature coil 4a will be increased. When the armature current again increases to the set value, the AND gate 7a is again closed and the transistor 10a is turned off, whereby the armature current is gradually reduced. That is, the operational amplifier 14a, the resistor 13a, and the AND gate 7a function as a chopper circuit which cyclically repeats the above-described operation, and accordingly, the armature current is regulated to a value 21a corresponding to the voltage at the reference positive voltage terminal 15, as shown in FIG. 4.

During the energization of the armature coil 4a in the reverse direction, which starts upon supply of the position detection signal 34a to the input terminal 9a of the energization control circuit, a chopping operation similar to that described above is performed by the AND gate 7b, the transistors 10c and 10d, and the operational amplifier 14a, whereby the armature current is regulated.

Further, during the energization of the armature coil 4b in the forward direction, which is initiated by the supply of the position detection signal 32a, to the input terminal 8b of the energization control circuit, a similar chopping effect is provided by the AND gate 7c, the transistors 11a and 11b and the operational amplifier 14b, and during the energization of the coil 4b in the reverse direction, which is initiated by the supply of the signal 35a to the input terminal 9b, the chopping effect is achieved by the elements 7d, 11c, 11d and 14b, whereby the armature current is regulated as indicated by dashed line 21b in FIG. 4.

Similarly, when an electric current is supplied to the armature coil 4c in the forward direction or in the reverse direction, due to the supply of the signals 33a or 36a to the input terminals 8c or 9c respectively, by the chopping action achieved by the operational amplifier 14c and other elements, the armature current is regulated, as indicated by dashed line 21c in FIG. 4. By controlling the voltage at the reference voltage terminal 15 in accordance with the speed of rotation of the motor, the motor can be operated at a constant speed.

The armature current (output torque) is on one hand controlled by the reference positive voltage, and on the other hand is independent of the voltage applied to the energization control circuit from the d.c. power supply, so that a ripple of the d.c. power supply voltage, even if it exists, affects only the chopper frequency. Therefore, when using a smoothing capacitor for rectifying an a.c. voltage, a capacitor having a small capacitance can be used. In an application wherein a three-phase a.c. power supply is used, a capacitor having an even smaller capacitance can be used, whereby the power supply can be reduced in size. Further, the usable width of the sine-wave voltage from the a.c. power supply is not limited to the vicinity of a peak value thereof, but covers approximately a ½ thereof, and thus electrical noise is reduced and the power factor can be increased.

In the second embodiment described above, the upper one of the transistors in each bridge circuit, as viewed in FIG. 7, is subjected to an on-off control for the chopper control, but the lower one of the transistors may alternatively be subjected to the on-off control. In this case, the transistor concerned is maintained in an unconductive state in accordance with the output of a monostable circuit, which operates in response to the outputs of the operational amplifiers 14a, 14b and 14c.

The advantages of this invention are as follows:

(1) In the case wherein the motor is driven by d.c. power obtained by rectifying an alternating current, a capacitor having a small capacitance can be used for the smoothing capacitor. Thus, electrical noise is reduced, the power factor of the motor can be improved, and an inexpensive small-sized power supply can be used.

(2) Since the capacitor is connected to the reverse current-preventing diode, which is connected in the forward direction to the d.c. power supply, the magnetic energy which is stored in the armature coil when the energization thereof is interrupted, is rapidly extinguished to cause the armature current to decrease rapidly with an increase in the voltage charged in the capacitor, and the charge voltage of the capacitor is applied to the armature coil to be energized next, causing the rapid rise of the armature current of this coil. Thus, the fall of the operating efficiency of the motor, which can be caused by the magnetic energy, is prevented, and the motor can be operated at a high speed of approximately 100,000 rpm. Further, this dispenses with the need of the high-voltage power supply in the case of such a high-speed operation.

(3) Since a chopper circuit is used in combination, the motor can be operated at a variable speed or constant speed by controlling the output torque of the motor, and the output torque can be variably controlled by changing the reference voltage applied to the chopper circuit.

I claim:

1. A direct current motor comprising:
  a position detection device for successively delivering a first position detection signal group and a second position detection signal group in accordance with the rotational position of a rotor of the direct current motor, the first position detection signal group including a plurality of position detection signals, the second position detection signal group including a plurality of position detection signals having a predetermined phase difference with respect to corresponding ones of the first position detection signal group;
  an energization control circuit connected to a direct current power supply for successively energizing armature coils of the individual phases in a forward direction in accordance with the first position detection signal group, and successively energizing said armature coils of the individual phases in a reverse direction in accordance with the second position detection signal group;
  diodes for preventing a reverse current, connected between the direct current power supply and said armature coils;
  capacitors, respectively connected to said diodes; and
  circuit means for charging magnetic energy, which is stored in said armature coils when an energization thereof is interrupted, in one of said capacitors connected to one of said diodes associated with one of said armature coils, thereby rapidly reducing the stored magnetic energy, and rapidly raising an armature current passing through said armature coils of each phase in the reverse direction, by a voltage charged in said one of said capacitors, when an energization of said armature coils in the reverse direction is started.

2. The direct current motor according to claim 1, further comprising a chopper circuit for controlling the current of the armature coil of each phase when the armature current flowing therethrough becomes greater than an upper limit by discharging the magnetic energy stored in the armature coil, and when the armature current becomes smaller than a lower limit, storing the magnetic energy in the armature coil until the armature current again becomes greater than an upper limit.

3. The direct current motor according to claim 1, wherein said position detection device successively generates the position detection signals that are continuous.

4. The direct current motor according to claim 1, wherein said position detection device comprises a plurality of position detecting elements for generating the position detection signals, said position detecting elements being equal in number to the phases of the direct current motor and fixed to an armature side of the direct current motor in such a manner that said position detecting elements are spaced from each other by a predetermined electrical angle.

5. The direct current motor according to claim 4, wherein said position detecting elements are fixed and located for generating position detection signals to energize said armature coils of the individual phases during a maximum torque generation period of the direct current motor.

6. The direct current motor according to claim 1, wherein said energization control circuit includes transistor bridge circuits connected to said armature coils of the respective phases, said armature coils turning on and off corresponding transistors in said transistor bridge circuits.

7. The direct current motor according to claim 1, further comprising a three-phase Y-connection direct current motor.

8. A three-phase Y-connection direct current motor comprising:
  a position detection device having a plurality of position detecting elements spaced from each other by an electrical angle of 120 degrees for detecting a position of a magnet rotor, the position detecting elements successively generating a first position detection signal group and a second position detection signal group, the first position detection signal group including a plurality of position detection signals, which will not be superimposed one upon another in time but are continuous having a width equivalent to an electrical angle of 120 degrees, the second position detection signal group including a plurality of position detection signals having a phase difference equivalent to an electrical angle of 60 degrees with respect to corresponding ones of the position detection signals of the first group;
  first, second, and third transistor bridge circuits for energizing armature coils of first, second, and third phases respectively in forward and reverse directions;

a direct current power supply for supplying electric power to said first, second, and third transistor bridge circuits;

an energization control circuit for successively and cyclically energizing said first, second, and third transistor bridge circuits in accordance with the first position detection signal group to energize the armature coils of the individual phases in the forward direction, and for successively and cyclically energizing said first, second, and third transistor bridge circuits in accordance with the second position detection signal group to energize the armature coils of the individual phases in the reverse direction;

first, second, and third diodes for preventing a reverse current, which are connected in the forward direction with respect to said first, second, and third transistor bridge circuits respectively;

first, second and third capacitors connected to said first, second, and third diodes respectively and having a predetermined capacitance; and an electrical circuit for charging magnetic energy, which is stored in each armature coil in the capacitor connected to the corresponding diode, when an energization of said each armature is interrupted at a falling end of a corresponding one of the position detection signals to thereby rapidly reduce the magnetic energy, as well as for rapidly raising an armature current by a voltage charged in the capacitor when the armature coil is energized in the reverse direction, said position detecting elements being fixed to a fixed armature side such that each period in which the armature coil is energized by the corresponding position detection signal coincides with a period in which a maximum torque is generated.

9. The direct current motor according to claim 8, further comprising:

an armature current-detecting circuit for detecting armature currents flowing through the armature coils of the first, second and third phases and for generating first, second and third detection signals; and a chopper circuit for starting and stopping the energization of armature coils in accordance with the first, a second and third detection signals for controlling the armature currents to a set value.

* * * * *